US005229218A

United States Patent [19]

Dobreski

[11] Patent Number: 5,229,218

[45] Date of Patent: Jul. 20, 1993

[54] RECYCLABLE PLASTIC CASH REGISTER RECEIPTS

[75] Inventor: David V. Dobreski, Fairport, N.Y.

[73] Assignee: Mobil Oil Corporation, Fairfax, Va.

[21] Appl. No.: 681,248

[22] Filed: Apr. 8, 1991

[51] Int. Cl.$^5$ .............................................. B32B 27/08

[52] U.S. Cl. .................................. 428/516; 428/35.7; 428/519; 428/520; 428/521

[58] Field of Search ............... 428/500, 516, 519, 520, 428/521, 35.7

[56] References Cited

U.S. PATENT DOCUMENTS 4,612,721 9/1986 Fumei .................................. 40/310

FOREIGN PATENT DOCUMENTS 281701 6/1987 European Pat. Off. .

3609736 10/1986 Fed. Rep. of Germany ...... 428/516

*Primary Examiner*—Edith Buffalow

*Attorney, Agent, or Firm*—Alexander J. McKillop; Charles J. Speciale

[57] ABSTRACT

A cash register receipt which is recyclable in a manner compatible with plastic sacks used for carrying retail articles such as groceries. The cash register receipts of the present invention are capable of receiving and displaying indicia of the transaction, such as the store name, the date of a transaction, the name of the item purchased, the purchased price, etc. and is formed of one or more materials which may be readily recycled simultaneously with a plastic grocery bag. Methods of utilizing recyclable cash register receipts in association with plastic grocery bags are also disclosed.

9 Claims, No Drawings

RECYCLABLE PLASTIC CASH REGISTER RECEIPTS

The present invention is directed to improved cash register receipts and, more particularly, to recyclable plastic cash register receipts and methods utilizing the same.

BACKGROUND OF THE INVENTION

Over recent years, legislators and other community leaders have taken significant steps to encourage and even legislate that certain materials must be recycled. For example, many communities throughout the United States now have active recycling programs for newspapers, glass, metal, and, in some cases, plastics. In some states, beverage manufacturers are required to collect cash deposits from consumers and to later return those deposits if the consumer returns the empty container for recycling.

The desire to create less solid waste has also impacted decisions of certain industries. For example, the use of certain disposable containers by fast-food companies has been banned in certain communities in light of the ultimate waste disposal problems caused by those containers. Thus, where a manufacturer or retailer might otherwise desire to use a particular product which has greater consumer appeal or is less expensive, that item may be rejected by society if it ultimately creates a waste disposal problem.

One product, which has met with some resistance from community and environmentalists, is the plastic grocery bag. In light of that resistance, some suppliers have established programs whereby those bags are collected for later recycling. While programs involving the recycling of these plastic bags shows promise, one significant impediment is the presence of conventional paper cash register receipts which are left in the returned bags. These paper cash register receipts can cause problems during the recycling of the plastic sacks. If the paper cash register receipt is not removed, the recycled material causes gel problems leading to significant extrusion problems during film production. Alternatively, if the paper cash register receipts must be removed, manual removal as well as alternate separation processes tend to be very costly.

In light of the desire to use plastic grocery bags and the overall desire to provide a readily recyclable product, it would be desirable to overcome the recycling problems inherent in using plastic bags with paper cash register receipts.

SUMMARY OF THE INVENTION

The present invention provides a novel cash register receipt which is recyclable in a manner compatible with plastic sacks used for carrying retail articles such as groceries. The cash register receipts of the present invention are capable of receiving and displaying indicia of the transaction, such as the store name, the date of a transaction, the name of the item purchased, the purchased price, etc. and is formed of one or more materials which may be readily recycled simultaneously with a plastic grocery bag. The present invention also comprises methods of utilizing recyclable cash register receipts in association with plastic grocery bags.

DETAILED DESCRIPTION

The present invention overcomes the recycling disadvantages of known cash register receipts when used with plastic grocery bags by providing a cash register receipt having a recycling compatibility with plastic packaging, such as plastic grocery bags. According to the present invention, the plastic cash register receipts may comprise polymers of polypropylene, polyethylene such as high density polyethylene, low density polyethylene, and linear low density polyethylene, polystyrenes such as high impact polystyrenes, polymethylmethacrylate, blends thereof such as polystyrene-polyethylene blends, and other films capable of receiving and displaying desired indicia.

The plastic cash register receipts of the present invention may comprise one or more layers of the abovereferenced materials.

In this regard, the plastic cash register receipts of the present invention must be capable of receiving indicia such as the name of a retail store, the date, the names and prices of items purchased, etc. The indicia may be provided on the plastic cash register receipts of the present invention by any known methods such as printing or by scoring a surface of the plastic film, either mechanically, chemically, or with heat. The film used for the plastic cash register receipts should be able to carry the indicia for at least 30 days, and more preferably, at least six months.

As used herein, the term "cash register receipt", includes all types of receipts commonly dispensed by a seller, such as a retailer, at the point of sale, including, but not limited to, receipts which are generated automatically by mechanical or electronic cash register machines, as well as credit card slips.

In order to maintain recycling compatibility with thermoplastic bags, the cash register receipts of the present invention are formed without any materials which will inhibit successful recycling. Such materials which cause such problems include non-thermoplastics such as naturally occurring fibrous materials such as cellulose, laminates of paper and thermoplastics, thermoset plastics. Those skilled in the art will appreciate that minor amounts of non-thermoplastics, e.g. titanium dioxide, may be present without impeding the successful recycling of the subject.

As used herein, the term "recycling compatibility" is used to indicate that the cash register receipt and shopping bag of the present invention may be successfully recycled in a single operation without prior separation of the cash register receipt and the shopping bag. This phrase is used to distinguish the present invention from prior attempts at recycling thermoplastic shopping bags which had been utilized with conventional, cellulose-based paper cash register receipts.

One embodiment of the present invention comprises a thermoplastic cash register receipt in combination with a flexible sack, such as a thermoplastic grocery bag. In this regard, the phrase "in combination" is not meant to indicate that the cash register receipt and the flexible sack are actually connected, but rather that these two elements are used together for their standard purposes. Those skilled in the art will appreciate that by way of a check-out clerk or a typical consumer, a cash register receipt often ends up within the flexible sack before or shortly after the consumer has left the retail establishment.

Another aspect of the present invention comprises a process for packaging an assortment of articles, for example groceries. According to this process, a cash register receipt comprising a first thermoplastic material is first provided with an indicia of said assortment of articles, for example their names, and then the assortment of articles is placed within a flexible sack. According to this process of the present invention, the sack and the cash register receipt have recycling compatibility. According to this process of the present invention, the cash register receipt is then associated with the flexible sack. As used herein, the term "associated" with is meant to include providing a consumer with both the cash register receipt and the flexible sack in a single transaction. This term does not require that the cash register receipt actually be placed within the flexible sack by the person performing the check-out operation at the point of sale.

What is claimed is:

1. A non-adhesive material useable for a cash register receipt comprising at least one thermoplastic material and formed in the absence of cellulose or other naturally occurring fibrous material, wherein said non-adhesive cash register material is to be used in non-connected, corecyclable combination with a thermoplastic sack.

2. A cash register receipt according to claim 1 wherein said thermoplastic material is selected from the group consisting of polypropylene, polyethylene, polystyrene, polymethyl-methacrylate, and mixtures thereof.

3. A cash register receipt according to claim 1 wherein said cash register receipt consists of a single layer of thermoplastic material.

4. A cash register receipt according to claim 1 wherein said cash register receipt comprises a plurality of layers of thermoplastic material.

5. A cash register receipt according to claim 1 wherein said thermoplastic material consists essentially of polypropylene.

6. A cash register receipt according to claim 1 wherein said thermoplastic material consists essentially of high density polyethylene.

7. A non adhesive material useable for a cash register receipt in non-connected combination with a flexible sack;

said cash register receipt material comprising a member of a group consisting of polypropylene, polyethylene, polystyrene, polymethyl-methacrylate and mixtures thereof;

said flexible sack comprising a member of a group consisting of high density polyethylene, linear low density polyethylene, low density polyethylene, and blends thereof;

wherein said cash register receipt and said flexible sack have recycling compatibility.

8. A cash register receipt according to claim 7 wherein said cash register receipt consists of a single layer of thermoplastic material.

9. A cash register receipt according to claim 7 wherein said cash register receipt comprises a plurality of layers of thermoplastic material.

* * * * *